Figure 1:
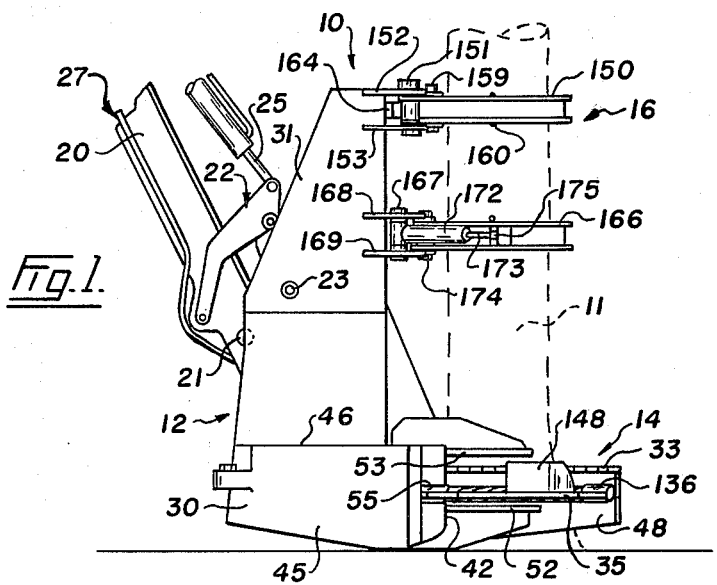

United States Patent [19]
Muirhead

[11] 3,902,538
[45] Sept. 2, 1975

[54] TREE FALLING APPARATUS

[75] Inventor: Aubrey S. Muirhead, Prince George, Canada

[73] Assignee: Muirhead Machinery Ltd., Prince George, Canada

[22] Filed: June 10, 1974

[21] Appl. No.: 478,151

[52] U.S. Cl. .................. 144/34 R; 144/309 AC
[51] Int. Cl.² ................................. A01G 23/08
[58] Field of Search .......... 144/34 R, 309 AC, 3 D; 83/928, 795

[56] References Cited
UNITED STATES PATENTS

| | | | |
|---|---|---|---|
| 3,394,744 | 7/1968 | Vit | 144/3 D |
| 3,457,977 | 7/1969 | Andersson et al. | 144/34 R |
| 3,461,928 | 8/1969 | Siiro | 144/34 R |

Primary Examiner—Donald R. Schran
Attorney, Agent, or Firm—Fetherstonhaugh & Co.

[57] ABSTRACT

Apparatus for harvesting trees using a sharpened-auger type cutter in the form of an elongated shaft to sever a tree near ground level. The rotary cutter is mounted on a blade which is movable scissorfashion with respect to an opposing anvil or buttress blade. The cutter and its supporting blade form part of an assembly which includes power means for rotating the rotary cutter about its longitudinal axis as well as power means for opening and closing the blade assembly. Above the cutter assembly, the apparatus is provided with powered clamping means which embraces the tree so as to hold a side of the tree immediately above the kerf cut by the cutter against the opposing anvil or buttress blade thereby supporting the tree during the cutting and a subsequent piling operation.

21 Claims, 12 Drawing Figures

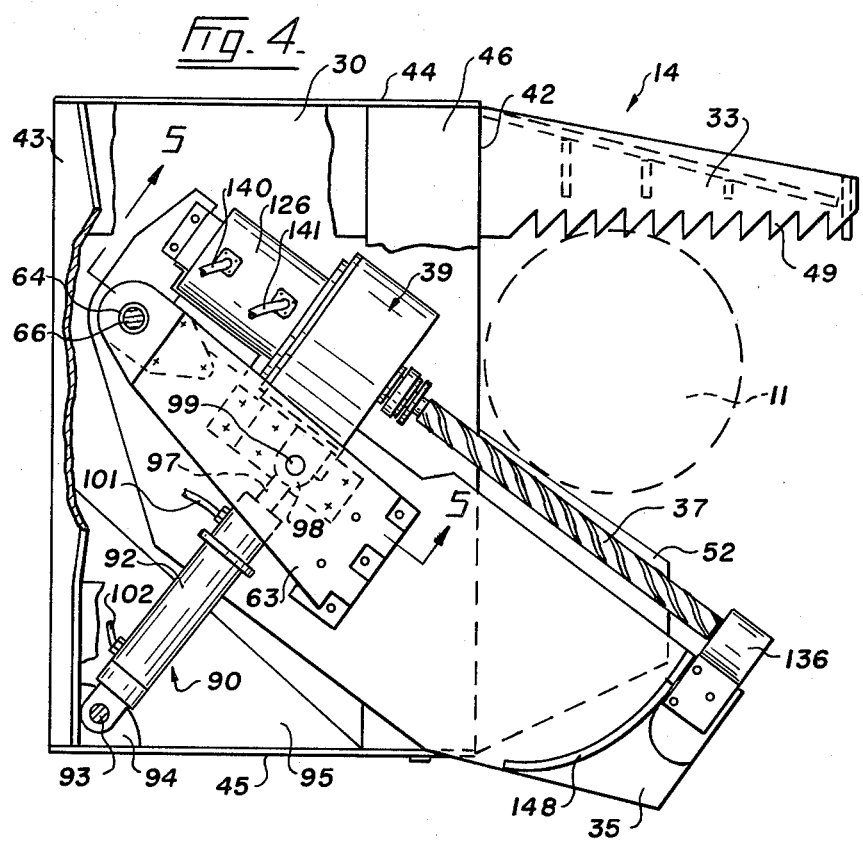
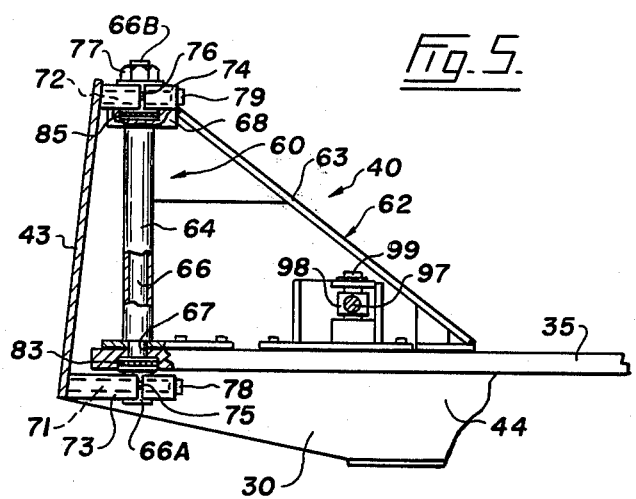

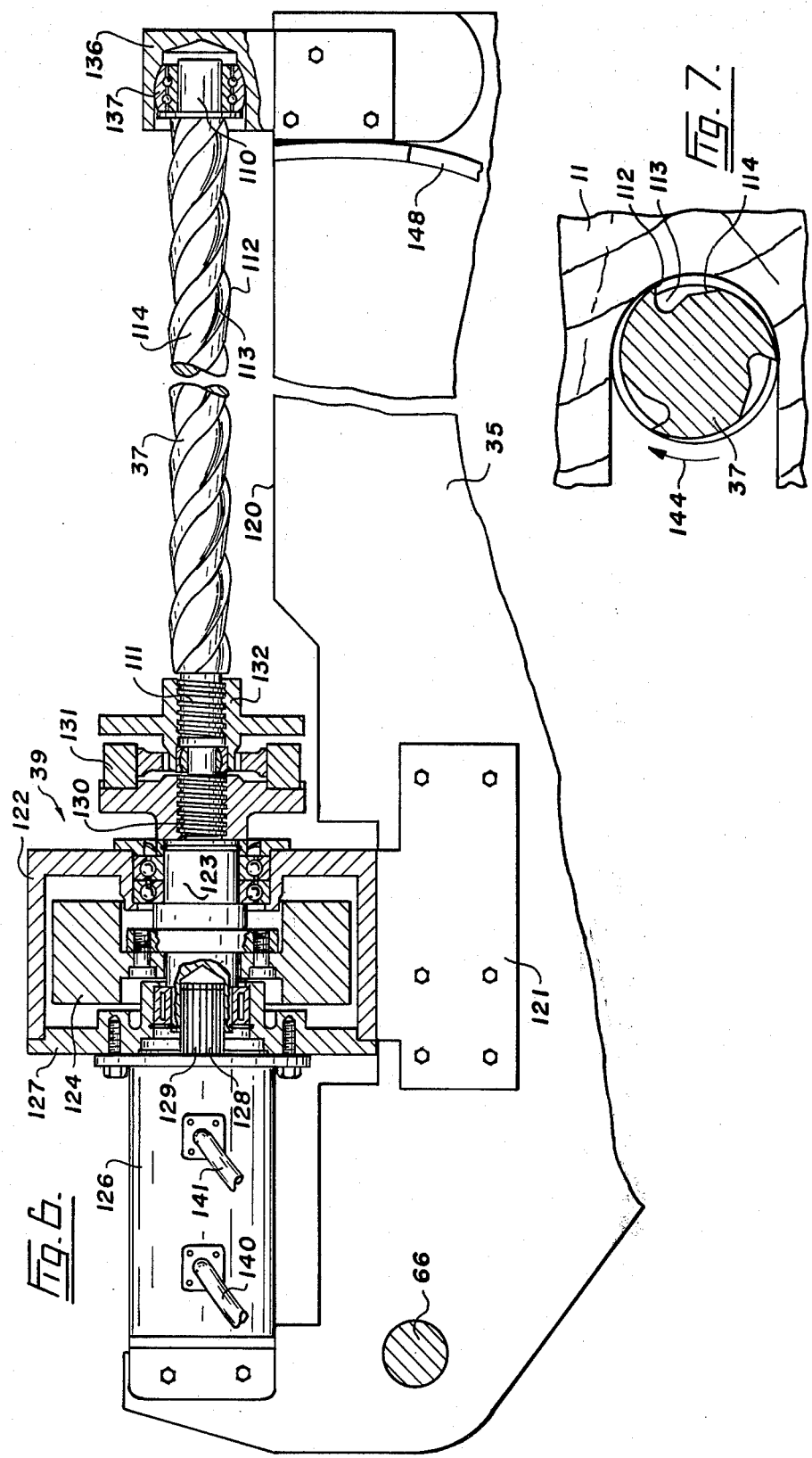

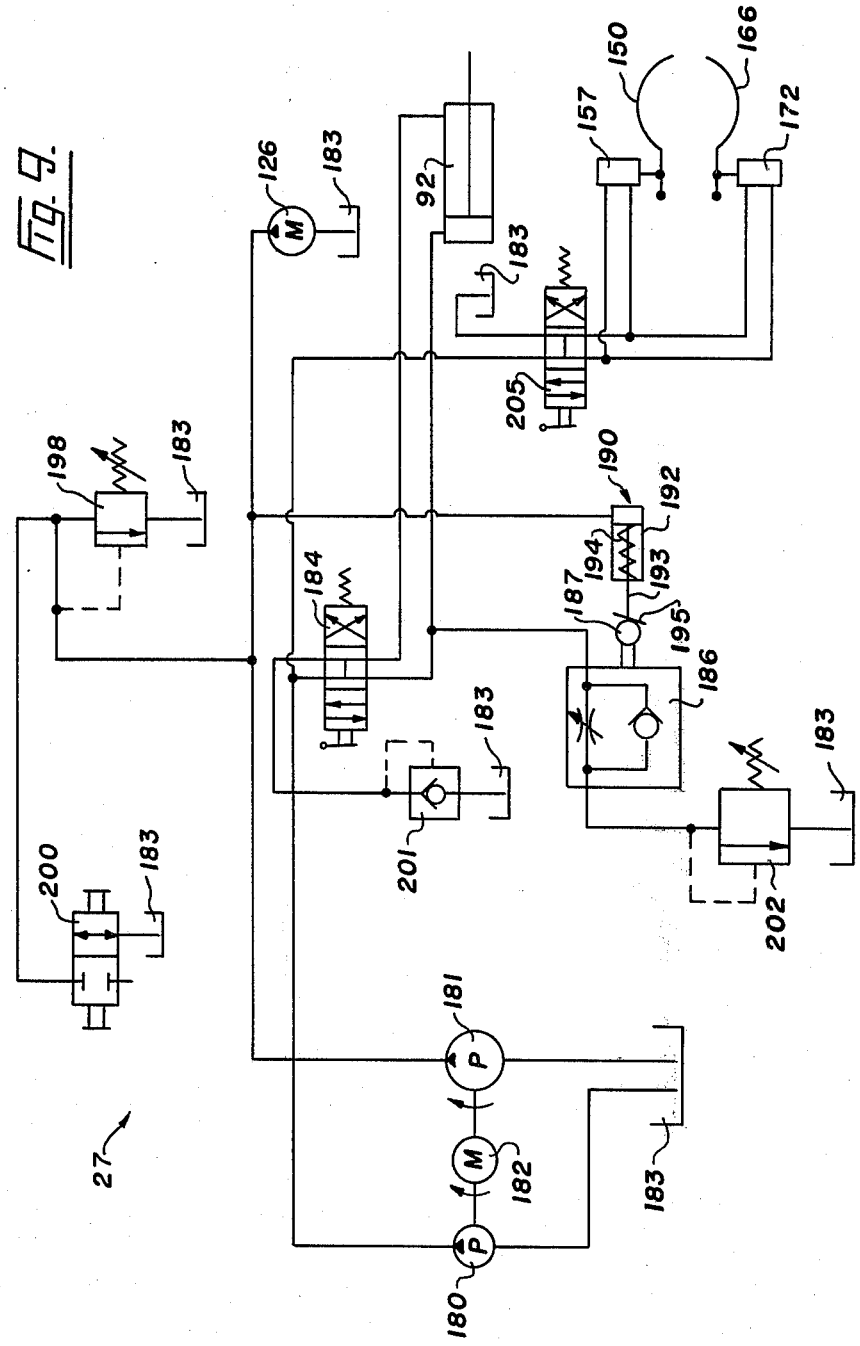

TREE FALLING APPARATUS

This invention relates generally to apparatus for falling trees and more particularly to a tree falling and bunching mechanism having a shaft-like rotary cutting tool.

There are a number of machines presently available to the logging industry which can fall trees in a faster and safer manner than can be done by means of a hand-operated chain saw. These machines commonly employ shears to snip off the trees close to the ground although some still utilize power driven chain saws which are mounted to be moved transversely of the trees by mechanical means. One machine of the shear-type which has found wide acceptance is described in U.S. Pat. No. 3,575,222 which issued on Apr. 20, 1971 to Frank J. Tucek and was assigned to Drott Manufacturing Corporation. This particular machine, like other known machines equipped with shears, is extremely useful under certain tree harvesting conditions but under other conditions may split or shatter the wood near the cut and, while this is not too important when the trees are used to produce pulp, it is important when the trees are used for the production of lumber or veneer in which case the damaged wood must be trimmed away and treated as waste.

The present invention provides a shaft-like rotary cutter similar to the one shown by U.S. continuation application Ser. No. 375,804 filed on July 2, 1973. However, the present apparatus includes a treeholding mechanism which provides proper control over the tree during the cut and immediately thereafter when the cut tree is lowered to the ground and preferably placed in a pile. The rotary cutter is sufficiently rugged to withstand forces which would easily damage a chain saw and is capable of cutting a clean kerf across a tree without damaging the butt end of the tree in the same manner as hydraulically-operated shears.

Figure 2:
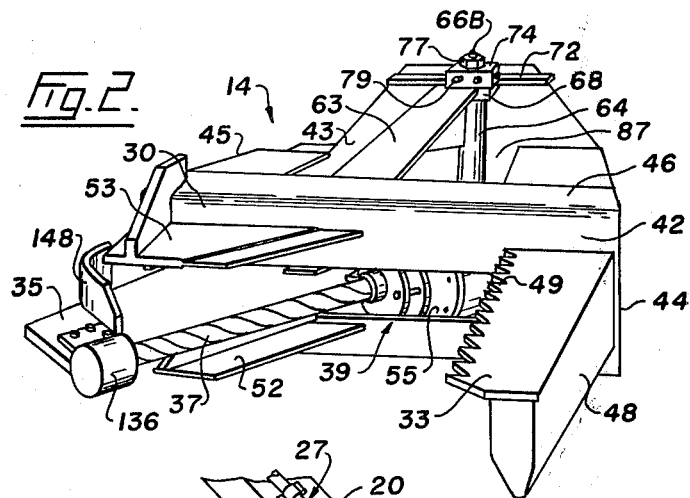
Figure 3:
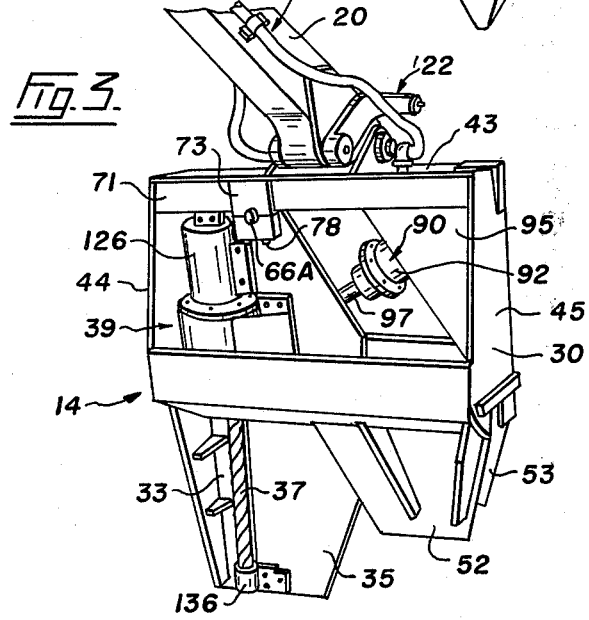
Figure 6:
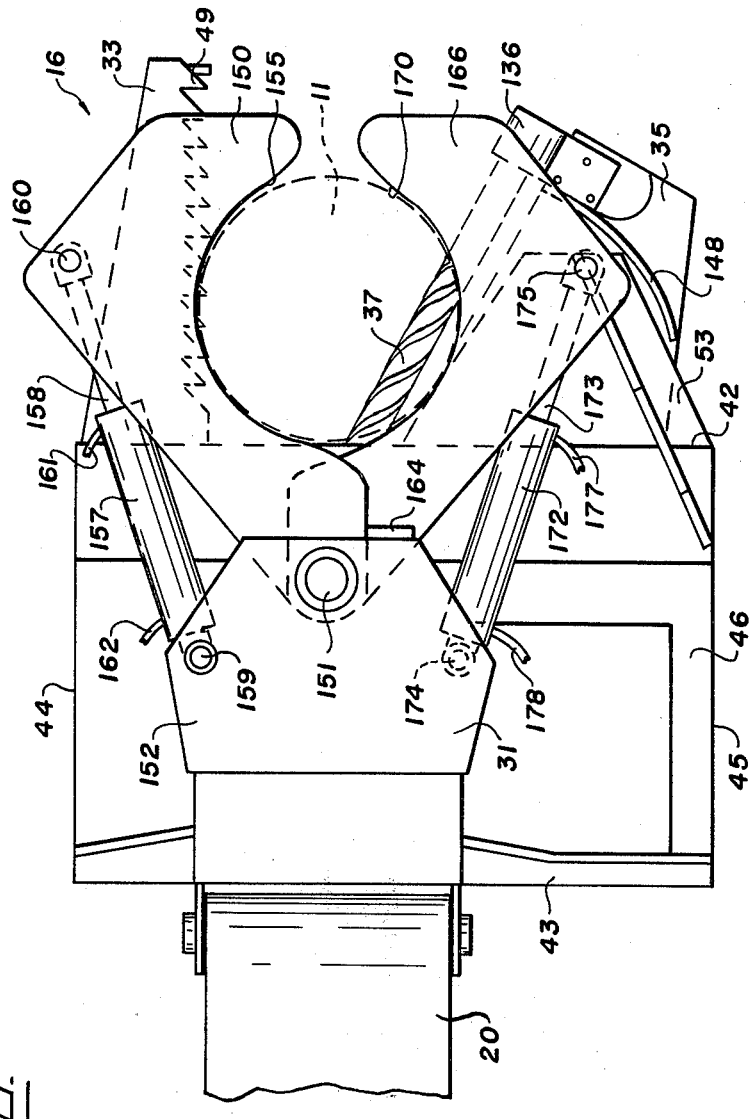
Figure 10:
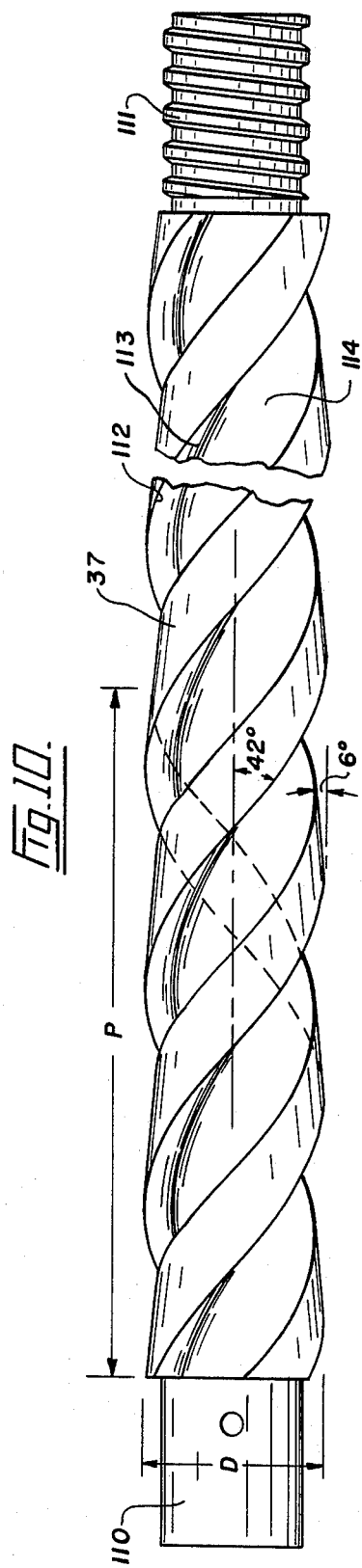
Figure 12:
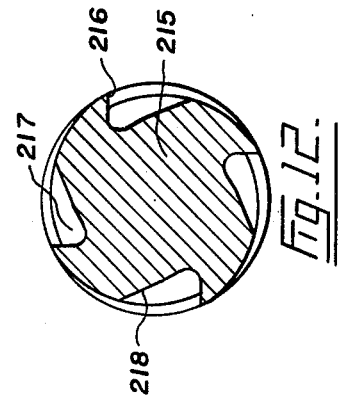
Figure 11:
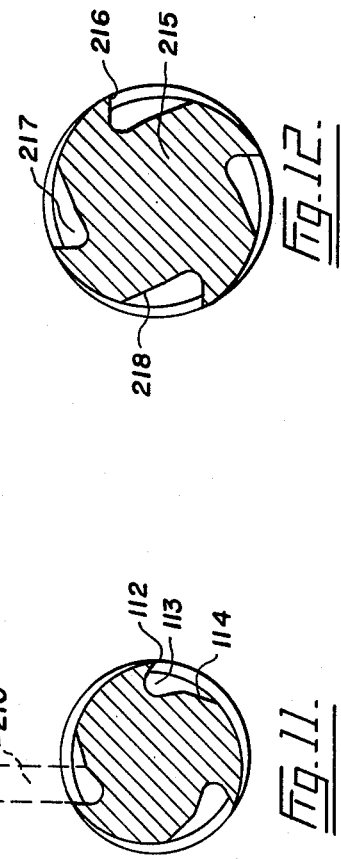

In drawings which illustrate a preferred embodiment of the invention,

FIG. 1 is a side elevation of tree falling apparatus constructed in accordance with the present invention, FIG. 2 is a perspective view showing only a cutter assembly of the apparatus as viewed from the front and with a blade assembly thereof in an open position, FIG. 3 is a perspective view of the underside of the blade assembly showing the assembly in closed position, FIG. 4 is an enlarged horizontal section of the cutter assembly with parts in elevation and again showing the blade assembly in open position, FIG. 5 is a fragmentary section taken on the line 5—5 of FIG. 4 but with associated parts purposely omitted and showing mounting means for the blade assembly, FIG. 6 is a further enlarged horizontal section, part broken away, and showing drive means for a rotary cutter carried by the blade assembly, FIG. 7 is a transverse section showing the rotary cutter at the start of a cutting stroke, FIG. 8 is a top plan view of the apparatus showing clamping means therefor, FIG. 9 is a diagram showing a hydraulic circuit of the apparatus, FIG. 10 is an enlarged fragmentary view of the rotary cutter FIG. 11 is a transverse section of the rotary cutter shown in FIG. 10, and FIG. 12 is a similar section of a modified rotary cutter.

Referring to the drawings and particularly to FIG. 1, the numeral 10 indicates generally apparatus which is intended to be clamped into supporting engagement with a standing tree 11 so that the tree can be cut through near ground level and immediately thereafter be lowered to the ground. For this purpose, the tree cutting apparatus 10 is provided with a frame 12 which supports a cutter assembly 14 as well as clamping means 16.

In order that the apparatus 10 may readily be moved through the wood during a tree harvesting operation, it is mounted on a suitable vehicle such as a mobile crane (not shown) which preferably is equipped with crawler tracks. One such crane which is particularly well suited for this purpose has an articulated boom 20 which can be extended and retracted as well as raised and lowered and swung horizontally through 360°. The frame 12 is attached to the extreme outer end of the boom 20 by a horizontally disposed and transversely extending pivot connection 21 which extends through the frame approximately at midheight and near the rear edge thereof. An arrangement of links and pivot pins generally indicated at 22 also connects the boom end to another pivot connection 23 extending through the frame 12 above and forward of the connection 21. The linkage 22 is pivotally connected by a hydraulic cylinder and its piston rod 25 to the top of the boom 20 and this cylinder forms part of a hydraulic circuit generally indicated at 27 which includes the usual pipes secured to the boom and connected to pumps and the like carried by the mobile crane with flexible hoses extending into the apparatus 10 to connect with various hydraulic devices therein which will be described in detail later.

By attaching the apparatus 10 to the boom 20 of a mobile crane as described above, the driver of the vehicle can operate valves and other controls included in the circuit 27 to swing the apparatus 10 between the generally upright position shown in FIG. 1 and the substantially horizontal position shown in FIG. 3. The hydraulic circuitry also enables the driver to manipulate the apparatus 10 whereby to place the frame 12 against a standing tree, to operate the clamping means 16 so as to embrace the tree, to make a cut across the base of the tree by actuating the cutter assembly 14, and finally to place the cut tree while properly supported in a pile to one side of the intended path of travel of the vehicle.

Frame 12 is constructed of two major sections; i.e., a bottom housing 30 which supports the operating parts of the cutter assembly 14, and a top portion 31 which carries the forwardly projecting clamping means 16. The design of the assembly 14 is such that it may readily be attached by welding, for example, to the portion 31, or to a number of other conventional tree handling mechanisms which perform much the same function as the clamping means 16.

In FIG. 2, the assembly 14 is shown for convenience detached from the remainder of the apparatus 10 and in this view the assembly is best shown to include an anvil or buttress blade 33 which opposes another blade 35, the latter blade supporting a sharpened auger-type rotary cutter 37 as well as drive means 39 for said cutter. The supporting blade 35, cutter 37 and associated parts provide a blade assembly generally indicated at 40.

Referring now particularly to FIGS. 2, 3 and 4, the bottom housing 30 of the frame is shown to comprise a box-like structure having front, rear, side and top walls 42 to 46 respectively. The buttress blade 33 projects forwardly of the front wall 42 near left side wall 44 thereof. The horizontally disposed blade 33 overhangs and is partly supported by a vertical side member 48 (see particularly FIG. 2) and the inner or right edge of said blade, which preferably is perpendicular to the front wall 42, is provided with teeth 49 for gripping the bark and wood on one side of a tree.

Opposite the buttress blade 33, and near right side wall 45 of the housing, the front wall 42 is fitted with lower and upper guard plates 52 and 53, see particularly FIGS. 1 to 3. These horizontal and forwardly projecting guard plates 52 and 53 are vertically spaced apart and located one above and one below a horizontal slot 55 formed in the front wall 42 of the housing, see particularly FIG. 2.

The supporting blade 35 projects freely through the slot 55 and the blade assembly 40 is mounted within the housing 30 by means generally indicated at 60. As best shown in FIG. 5, the mounting means 60 comprises a heavily constructed bracket 62 which is firmly secured to the top surface of the blade 35 near the inner end thereof. The substantially triangular bracket 62 includes a sloping top member 63 and a vertical rear sleeve 64 which is rotatably mounted on a heavy hinge bolt 66, this elongated bolt projecting through an opening 67 in the blade 35 as well as through a collar 68 fitted to the top of said sleeve. In order to support the hinge bolt 66 on which the supporting blade 35 is swingably mounted, the forwardly sloping rear wall 43 of the housing is fitted with lower and upper flanges 71 and 72, the latter flange being carried on the upper end of the rear wall which projects above the top wall 46 as shown in FIG. 2. Secured to the normally horizontal flanges 71 and 72, are mounting blocks 73 and 74 having openings 75 and 76 to receive the head 66A and threaded upper end 66B of the bolt, which upper end is fitted with a nut 77. The forwardly projecting blocks 73 and 74 are divided vertically through the axes of the openings 75 and 76 with the two parts of the blocks being secured together by clamping bolts 78 and 79.

A self-aligning thrust bearing 83 is fitted between the underside of the blade 35 and the head 66A of the bolt. The collar 68 is fitted with a similar bearing 85 through which the bolt 66 projects and this top bearing engages the underside of the upper block 74.

The above described mounting means 60 for the assembly 40 provides a very strong hinge construction for the blade 35 so that the blade can swing in a normally horizontal plane without appreciable vertical deflection even at the extreme front end of the blade. In FIG. 2, the upper portion of hinge bracket 62 will be seen projecting upwardly through an opening 87 formed in the top wall 46 of the housing. Thus, the sleeve 64 and bolt 66 are quite lengthy when related to the overall length of the blade 35 and this is important since the blade is required to carry the rotary cutter 37 and drive means 39 both of which are quite heavily constructed. Furthermore, the cutter 37 must be held as steadily as possible as it is advanced through the tree during its cutting stroke in order to avoid damage to the cutter or an uneven cutting action. If excessive wear takes place in the bearings 83 and 85, the clamping bolts 78 and 79 can be slacked off momentarily to allow the nut 77 to be tightened so as to remove any undesirable amount of slack motion in the mounting means 60.

The assembly 40 is adapted to be moved scissor-fashion between open and closed positions with respect to the blade 33 by power means generally indicated at 90, see FIG. 4. Means 90 comprises a hydraulic cylinder 92 which is pivotally connected by a pin 93 to a corner bracket 94 secured to the housing walls 43 and 45 above a reinforcing gusset 95. This cylinder 92 has a piston rod 97 the outermost end of which is pivotally connected as at 98 to a pin 99 mounted on the supporting blade 35 to extend through the bracket 62 as shown best in FIG. 5. The opposite ends of the cylinder 92 are fitted with hose lines 101 and 102 which extend outwardly of the housing 30 to the boom 20 and which form part of the hydraulic circuit 27. Thus, the cylinder 92 is adapted to be pressurized whereby to swing the blade 35 towards and away from the buttress blade 33 and, during this scissor-like movement, the rotating cutter 37 is moved through a cutting and return stroke.

Referring to FIGS. 6 and 7, the cutter 37 will be seen to comprise a shaft which is generally cylindrical between a plain outer end 110 and a threaded inner end 111. Formed on the shaft between these opposite ends, are helical cutting edges 112 which are separated by flutes 113 and clearance faces 114. The cutting edges 112 are deeply undercut by the flutes 113 and the pitch of those edges is elongated, for example, each edge 112 may make three revolutions of a cutter which has a length of some 27 inches between the plain and threaded ends. The combination of cutting edges with a lengthy pitch and flutes which are deep and wide has been found best suited for cutting transversely through a tree with the present auger-type cutter since the wood chips augered out then have less tendency to pack together and thereby resist travel lengthwise of the cutter.

Cutter 37 is mounted to extend parallel to inner or left edge 120 of the blade 35 with the cutter projecting a suitable distance above and below the top and bottom surfaces of the heavy plate which forms said blade. To support the cutter in this manner, the drive means 39 is secured by a mounting bracket 121 to the blade 35 as best shown in FIG. 6. The means 39 comprises a cylindrical casing 122 (FIG. 6) and suitably journalled in this casing is a shaft-like extension 123 which is fitted with a flywheel 124. A hydraulic motor 126 is bolted to a removable cover plate 127 of the casing and a splined drive shaft 128 of this motor is entered into a splined recess 129 formed in the inner end of the extension 123. The extension 123 has a threaded outer end 130 to which a flexible coupling 131 is secured. This coupling 131 has an internally threaded sleeve 132 spaced from the end 130 and the cutter end 111 is lodged in this sleeve. The plain outer end 110 of the rotary cutter is supported from the blade 35 by means of a bracket 136 and a self-aligning bearing 137 is carried by this bracket to suitably support the extreme outer end of the cutter. Near the bearing 137, a curved stop flange 148 is mounted on the blade 35. The rear end of this vertically disposed flange 148 curves around the adjacent corner of the upper guard plate 53 when the cutter-supporting blade 35 is fully open and the opposite or outer end of said flange enters beneath the buttress blade 33 when the former blade is closed.

The motor 126 is connected by supply and return hoses 140 and 141 into the hydraulic circuit 27 whereby pressurized fluid can be directed to the hydraulic motor to rotate the cutter 37 in the direction of arrow 144 shown in FIG. 7. Cutter 37, even though it is a solid shaft, is slightly flexible due to its relatively long length as compared to diameter but the flexible coupling 131 and self-aligning bearing 137 allow the shaft to bend as required without damage to supporting parts or interference with the drive means 39.

Referring now to FIGS. 1 and 8, the clamping means 16 will be seen to comprise an upper clamp arm 150 which projects forwardly of the frame portion 31 near the top thereof and on the same side of the apparatus as the buttress blade 33. The normally horizontal arm 150 is swingingly mounted on the portion 31 by means of a vertical pivot shaft 151 which is carried between vertically spaced plates 152 and 153 welded or otherwise secured to the frame portion. As shown in FIG. 8, the horizontally swingable clamp arm 150 has an inner face 155 which is curved to provide a suitable grip on trees of varying diameter which are cut by the present apparatus.

The arm 150 is moved into and out of engagement with a tree by a hydraulic cylinder 157 having a piston rod 158. Pivot pins 159 and 160 respectively connect the double acting cylinder 157 and rod 158 to the frame portion 31 and arm 150. Opposite ends of the cylinder 157 are connected by hose lines 161 and 162 into the hydraulic circuit 27 whereby the driver of the vehicle carrying the apparatus 10 has control over the movements of the arm 150. However, the arm 150 can swing inwardly only to a defined position wherein the curved inner face 155 is substantially vertically aligned with the teeth 49 on the buttress blade. This defined position of arm 150 is determined by a stop 164 which extends between the plates 152 and 153 on the front face of the frame portion 31 so as to be engaged by the pivoted end of the arm as shown best in FIG. 8.

The clamping means 16 also includes a similarly constructed clamp arm 166 which is mounted on frame portion 31 a suitable distance below the upper arm 150 and on the same side of the frame as the blade 35. This lower clamp arm 166 pivots about a pin 167 (FIG. 1) which is carried by vertically spaced plates 168 and 169 secured to the frame portion 31. Arm 166 has a curved inner face 170 adapted to engage the convex outer periphery of a tree on the opposite side of the tree to the arm 150.

A double acting hydraulic cylinder 172 and piston rod 173 therefor are provided to swing the arm 166 horizontally across the frame whereby to act in opposition to the arm 150. This cylinder is secured to the frame portion 31 by a pivot pin 174 and another such pin 175 serves to attach the rod 173 to the arm 166. Hose lines 177 and 178 connect the cylinder 172 into the hydraulic circuit 27 and again the driver of the vehicle can swing the lower clamp arm transversely across the frame 12. It should be noted there is no stop such as 164 to limit the transverse swinging movement of the lower clamp arm 166.

Referring now to FIG. 9, which shows the above described hydraulic cylinders connected by the circuit 27 to other elements of that circuit mounted on the mobile crane which include a hydraulic pump 180 and a relatively large capacity hydraulic pump 181. The small capacity pump 180 and the pump 181 are driven by a common electric motor 182 and preferably both pumps draw oil from a common reservoir 183. The operation of the cylinder 92 to open and close the blade assembly 40 is controlled by a manually-operated, four-way, three-position, control valve 184. In the circuit 27 there is a flow-control valve 186 which normally is held in the closed position by its spring (not shown), the valve being of the rack and gear type which has a cam follower 187. Valve 186 is adapted to be opened by an operating device 190 comprising a cylinder 192 having a piston rod 193 which is biased to retracted position by a spring 194. A cam 195 on the rod 193 engages the cam follower 187 whereby to open the flow control valve 186 when the blind end of the cylinder 192 is suitably pressurized. The motor 126 and large pump 181 are protected from being overloaded by a pilot-operated, relief valve 198 of the type which can be vented by a remotely situated valve which, in this instance, is an on-off control valve 200. Circuit 27 also includes a check valve 201 which is adjusted to act as a restriction for oil passing therethrough to the reservoir 183 and this valve is set at a pressure of approximately 65 pounds per square inch (p.s.i.). A direct-acting relief valve 202 adjusted to a pressure of between 90 and 150 p.s.i. is also included in the circuit 27. The cylinders 157 and 172 which open and close the arms of the clamping means 16 are controlled by another manually-operated, four-way, three-position, control valve 205.

To prepare the apparatus 10 to cut down a tree, the electric motor 182 is started and pump 181 delivers oil to the hydraulic motor 126 which drives the rotary cutter 37 continuously at a suitable speed. Valve 200 normally is closed so that the cutter 37 rotates constantly during the tree harvesting operation or at least is only halted when the apparatus is being moved by the vehicle to be positioned alongside a tree to be cut. The flywheel 124, of course, helps to keep the speed of rotation of the cutter 37 constant and therefor it is undesirable to stop and start the cutter any more than absolutely necessary. The relief valve 198 is preset to open at about 2200 p.s.i. and the valve 200 is opened only when it is necessary to vent this relief valve and thereby bring the cutter to a halt. The small capacity pump 180 is adapted to deliver suitably pressurized oil to the cylinder 92 through the control valve 184 but, when this valve is in the central or neutral position in which it is normally held by its spring, the pressurized oil is simply circulated through said control valve and is returned through the valve 201 to the reservoir. Valve 205 in its spring-held neutral position allows pressurized oil from the pump 180 to recycle back to the reservoir 183.

The tree falling apparatus 10 now is assumed to be positioned as shown in FIG. 1 with the frame 12 longside the tree 11 which is located between the open blades of the cutter assembly 14 and also between the open arms of the clamping means 16. With the buttress blade 33 engaging one side of the tree, the vehicle operator actuates valve 205 to embrace the tree with the clamp arms 150 and 166. The arm 150, which has only limited transverse movement because of the stop 164, and the blade 33 engage one side of the tree while the arm 166 engages the opposite side of the tree at a point between the upper arm and the buttress blade thereby applying a clamping force which securely holds the tree against movement relative to the frame 12 before, during and after the cut is made.

The operator now moves the lever of valve 184 to direct oil to the blind end of the cylinder 92 and this swings the supporting blade 35 inwardly to start the rotating cutter 37 on its cutting stroke. Valve 201 restricts the flow of oil from the rod end of cylinder 92 so that said cylinder will not cause the cutter to advance too freely whereby to pull into the cut and perhaps stall. The cutter 37 engages the tree and starts the cut as shown in FIG. 7 with some of the wood chips being thrown outwardly of the kerf while other chips travel along the flutes 113 to drop to the ground from near the ends of the cutter. As the cut progresses towards the center of the tree, an increasing amount of wood must be removed with each revolution of the cutter and this results in an oil-pressure built-up at the motor 126. The operating device 190 reacts to this pressure increase and gradually opens the valve 186 and thereby returns some of the pressurized oil to the reservoir 183 through the valve 202. Thus, the cutting stroke is slowed according to the resistance encountered by the cutter 37 and, after passing the center of the tree, the cutter will gradually regain normal operating speed. Should the cutter bind in the kerf or encounter an obstruction of some kind, it may slow to a point where the device 190 and valve 186 cooperate to halt the cutting stroke altogether until such time that the cutter rotates itself free of the binding influence or clears the obstruction. The pressure between the pump 181 and motor 126 will then drop to normal whereupon the device 190 allows the valve 186 to return to its former position and the cutting stroke restarts. In this manner, the cutting stroke is controlled automatically with the relief valve 202 maintaining its adjusted pressure in the circuit to prevent surging which could result in a cutting stroke which was too irregular.

The hydraulic circuit 27 will be seen to have a number of elements which allow a auger-type rotary cutter 37 to operate effectively in cutting trees which may vary in diameter and present certain obstructions to the passage of the cutter such as an accumulation of sap or moisture in the wood. The device 190 opens and closes the valve 186 according to oil pressure at the motor 126 provided that pressure does not exceed 2200 p.s.i. at which time the valve 198 will open to prevent damage to the system. Thus, the rate of advancement of the cutter is determined by the cutter speed as sensed by the load on the hydraulic motor. The relief valve 202 ensures that a selected amount of pressure is kept in the blind end of cylinder 92 and the cutter 37 is held against the wood at the end of the kerf and some cutting will take place even if the cutter slows down. The cutting stroke will then be executed without unnecessary stopping and starting and the cutter 37 is applied to the wood with a pressure substantially inversely proportional to the load imposed upon the motor 126. The valve 201 maintains a selected pressure within the rod end of the cylinder 92 and this prevents the cutter from advancing too quickly and perhaps digging itself into the wood to the extent that it slows down and stalls.

In FIG. 7, it will be noted that the cutter 37 rotates towards the top of kerf although removal of wood chips takes place around the semi-circumference of the cutter. The rotation of the cutter tends to force the tool downwardly but the blade 35 which follows the cutter through the cut engages the lower side of the kerf and prevents undue flutter of the tool during the cutting action.

The direction of rotation of the cutter as indicated by arrow 144 in FIG. 7 is such as to exert a force tending to push the tree away from the front wall 42 of the bottom housing but this force is more than counteracted by the manner in which the tree is gripped by the apparatus. The inwardly directed teeth 49 of the buttress blade bite into the wood and resist relative movement. This bite is maintained by the action of the clamp arm 166 which pushes the tree against the other clamp arm 150 and the buttress blade 33 whereby to apply a firm grip on the tree and hold it against moving up or down particularly after it is severed completely.

When the cutter 37 reaches the end of its cutting stroke after severing the tree, it is positioned beneath the buttress blade 33 and is protected from being damaged by the tree during the time the apparatus 10 is tilted and lowered to place the tree to one side usually a short distance away from the stump. The stop flange 148 encircles part of the tree trunk opposite the buttress blade and this too ensures that the butt end of the tree does not kick away from this blade as the tree is lowered to the ground.

Referring now to FIGS. 10 and 11 which show the cutter 37 in detail, this tool is shaped from a solid cylindrical shaft of good quality alloy steel. The shaft is machined as required and later is tempered and case hardened to provide a tough and flexible tool having long lasting cutting edges 112. In this instance, the pitch P of the helical cutting edges 112 is about three times the diameter D while the radial depth of each helical flute 113 is about one-sixth the shaft diameter. The pitch to shaft diameter ratio then is 3 to 1 and the shaft diameter to flute depth ratio is close to 6 to 1. Each cutting edge 112 is disposed at an angle of approximately 42° to the longitudinal axis of the shaft and each clearance face 114 is disposed at an angle of about 6° to that axis.

The foregoing ratios for the shaft cutter can be varied as long as they provide a tool with the strength and other characteristics needed to withstand the long periods of rough usuage likely to be encountered during a tree harvesting operation. A tool of such a diameter is extremely rugged but the overall length which may be 3 feet or more provides the cutter with a certain amount of flexibility which is important. Even more importantly, the deep flutes and lengthy pitch ensure that the shaft cutter does not become clogged with wood chips as would almost certainly occur if an attempt was made to use an elongated cutter of conventional design for the same purpose. The wood chips which collect in the flutes can travel around with the cutter until they are either thrown clear or travel along the flutes helically of the shaft before being discharged from opposite sides of the tree and this freedom of travel is attributed to the depth of the flutes combined with the extremely long pitch of the cutting edges. Furthermore, the cutting edges 112 can readily be sharpened by use of a power sharpener having a rounded stone such as is indicated by the numeral 210 in FIG. 11.

FIG. 12 shows a modified shaft cutter 215 which has a larger diameter and therefor is provided with four helical cutting edges 216 with a corresponding number of similarly shaped flutes 217 and clearance faces 218. This cutter 215 is proportionately longer as well but the previously mentioned ratios and angles are maintained so that the same effective cutting action of the cutter 37 is achieved.

From the foregoing, it will be apparent there is provided apparatus which can readily cut and fall trees without danger to the single operator and under conditions of weather and terrain which could bring conventional tree falling to a halt. The auger-type cutter is extremely rugged and can operate effectively when there is snow or ice present on the trees or on the tool itself as is so often the case. It has been found that, under normal conditions, the tool will cut for the entire shift of the operator before it becomes dull whereupon it is quite easily removed from the supporting blade for resharpening.

I claim:

1. Tree falling apparatus comprising a frame, a buttress blade projecting forwardly of the frame for placement against one side of a tree, a blade assembly opposing the buttress blade and including a supporting blade, mounting means securing the blade assembly to the frame for movement between open and closed positions with respect to the buttress blade, a rotary cutter journalled on the supporting blade and having helical flutes and cutting edges capable of removing wood chips from a tree with a rotary cutting action, drive means for rotating the rotary cutter about the longitudinal axis thereof, power means for moving the blade assembly whereby the rotating rotary cutter is moved transversely through a tree towards the buttress blade in a cutting stroke and in the opposite direction in a subsequent return stroke, clamping means mounted on the frame above the blades, and means for moving the clamping means into and out of engagement with a tree whereby a tree is gripped and supported during and after the cutting operation and subsequently released.

2. Tree falling apparatus as claimed in claim 1, in which the pitch of the helical cutting edges and the diameter of the rotary cutter have a ratio of about 3 to 1.

3. Tree falling apparatus as claimed in claim 2, in which the diameter of the rotary cutter and the radial depth of each helical flute have a ratio of about 6 to 1.

4. Tree falling apparatus as claimed in claim 1, in which said clamping means comprises vertically spaced clamp arms which engage the same sides of the tree as the buttress blade and the rotary cutter respectively.

5. Tree falling apparatus as claimed in claim 1, in which said buttress blade comprises a top plate positioned to overhang the rotary cutter at the completion of the cutting stroke.

6. Tree falling apparatus as claimed in claim 5, said top plate having a toothed inner edge engaging the side of the tree and cooperating with the clamp arms to counteract an outwardly directed force applied to the tree by the cutting action of the rotary cutter.

7. Tree falling apparatus as claimed in claim 1, and including at least one guard plate projecting forwardly of the housing to protect the rotary cutter at the completion of the return stroke.

8. Tree falling apparatus as claimed in claim 1, and including a stop flange on the supporting blade, said stop flange encircling a portion of the tree when the rotary cutter approaches completion of the cutting stroke.

9. Tree falling apparatus as claimed in claim 1, in which said mounting means comprises an elongated hinge bolt, mounting blocks securing opposite ends of the hinge bolt to a rear part of the frame for endwise adjustment, a bracket secured to an inner end of the supporting blade and having a rear sleeve rotatably mounted on the elongated hinge bolt, and self-aligning thrust bearings at opposite ends of the rear sleeve journalling the supporting blade and being adjustable by endwise adjustment of the elongated hinge bolt.

10. Tree falling apparatus as claimed in claim 1, in which said drive means comprises a motor having a drive shaft, an extension connected to the drive shaft, a flywheel mounted on the extension, a sleeve nonrotatably mounted on an end of the rotary cutter, and a flexible coupling connecting the sleeve to the extension.

11. Tree falling apparatus as claimed in claim 1, and including circuit means for delivering pressurized fluid to the drive means and the power means, said circuit means including a flow control valve and an operating device therefor, said operating device opening the flow control valve to reduce the pressure of the fluid being delivered to the power means in proportion to an increase of pressure above a predetermined valve developed at the drive means in response to an overload on the rotary cutter.

12. Tree falling apparatus as claimed in claim 11, in which said circuit means includes a first valve arranged to maintain a selected pressure in the fluid being delivered to the power means to move the blade assembly to closed position.

13. Tree falling apparatus as claimed in claim 12, in which said circuit means includes a second valve arranged to maintain a selected fluid pressure in the power means to resist movement of the blade assembly to closed position.

14. Tree falling apparatus comprising a frame having a bottom housing and a top portion, a buttress blade projecting forwardly of the bottom portion for placement against one side of a tree near ground level, a blade assembly opposing the buttress blade and including a supporting blade, mounting means securing the blade assembly to the bottom housing for movement between open and closed positions with respect to the buttress blade, a rotary cutter journalled on the blade assembly near an inner edge of the supporting blade and having helical flutes and cutting edges, drive means for rotating the rotary cutter about its longitudinal axis, power means for closing and opening the blade assembly to move the rotary cutter through a cutting stroke and a return stroke, an upper clamp arm mounted on the top portion for swinging movement across the front of the frame, a lower clamp arm mounted on the top portion in spaced relation to the upper clamp arm and for swinging movement across the front of the frame, said upper and lower clamp arms being arranged to engage the same opposite sides of the tree as the buttress blade and the rotary cutter respectively, power means for swinging the upper and lower clamp arms into clamping engagement with a tree entered between the buttress blade and the rotary cutter, and circuit means for delivering pressurized fluid to the drive means and the power means.

15. Tree falling apparatus as claimed in claim 14, in which said circuit means includes a flow control valve and an operating device therefor, said operating device opening the flow control valve to reduce the pressure of the fluid being delivered to the blade assembly moving power means in proportion to an increase of pressure above a predetermined valve developed at the drive means in response to an overload on the rotary cutter.

16. Tree falling apparatus as claimed in claim 15, in which said circuit means includes a first valve arranged to maintain a selected pressure in the fluid being delivered to the blade assembly moving power means to move the said blade assembly to closed position.

17. Tree falling apparatus as claimed in claim 16, in which said circuit means includes a second valve arranged to maintain a selected fluid pressure in the blade assembly moving power means to resist movement of said blade assembly to closed position.

18. A cutter assembly comprising a housing having front, rear and top walls, a buttress blade projecting forwardly of the front wall and having a toothed inner edge for engaging one side of a tree, a blade assembly opposing the buttress blade and including a supporting blade having an inner edge, mounting means securing the blade assembly to the rear wall for swinging movement between open and closed positions with respect to the buttress blade, said mounting means comprising an elongated hinge bolt, mounting blocks securing opposite ends of the elongated hinge bolt to the rear wall for endwise adjustment, a bracket secured to an inner end of the supporting blade and having a rear sleeve rotatably mounted on the elongated hinge bolt, and self-aligning thrust bearings at opposite ends of the rear sleeve journalling the blade assembly and being adjustable by endwise adjustment of the elongated hinge bolt, a rotary cutter journalled on the supporting blade near the inner edge and having flutes and helical cutting edges capable of removing wood chips from a tree with a rotary cutting action, drive means for rotating the rotary cutter about the longitudinal axis thereof, and power means for closing and opening the blade assembly whereby the rotating rotary cutter is moved transversely through a tree towards the buttress blade in a cutting stroke and in the opposite direction in a subsequent return stroke.

19. Tree falling apparatus as claimed in claim 18, and including circuit means for delivering pressurized fluid to the drive means and the power means, said circuit means including a flow control valve and an operating device therefor, said operating device opening the flow control valve to reduce the pressure of the fluid being delivered to the power means in proportion to an increase of pressure above a predetermined valve developed at the drive means in response to an overload on the rotary cutter.

20. Tree falling apparatus as claimed in claim 19, in which said circuit means includes a first valve arranged to maintain a selected pressure in the fluid being delivered to the power means to move the blade assembly to closed position.

21. Tree falling apparatus as claimed in claim 20, in which said circuit means includes a second valve arranged to maintain a selected pressure in the fluid being delivered to the power means to resist movement of the blade assembly to closed position.

* * * * *